United States Patent [19]

Landay et al.

[11] 4,245,406
[45] Jan. 20, 1981

[54] ATHLETIC SHOE

[75] Inventors: David L. Landay, Brookline; Alvan H. Wolf, Worcester, both of Mass.

[73] Assignee: Brookfield Athletic Shoe Company, Inc., East Brookfield, Mass.

[21] Appl. No.: 35,614

[22] Filed: May 3, 1979

[51] Int. Cl.³ .......................................... A43C 13/08
[52] U.S. Cl. ...................................... 36/14; 36/30 R; 36/32 R; 36/59 C; 264/244
[58] Field of Search ............. 36/14, 30 R, 32 R, 59 C, 36/59 R, 44; 264/244

[56] References Cited

U.S. PATENT DOCUMENTS

| 3,510,968 | 5/1970 | Hobbs, Jr. et al. | 36/14 X |
| 3,549,472 | 12/1970 | King et al. | 36/44 X |
| 3,793,750 | 2/1974 | Bowerman | 36/59 C |

FOREIGN PATENT DOCUMENTS

| 2017719 | 11/1971 | Fed. Rep. of Germany | 36/32 R |
| 1126535 | 9/1968 | United Kingdom | 36/14 |
| 1536901 | 12/1978 | United Kingdom | 36/14 |

Primary Examiner—James Kee Chi

[57] ABSTRACT

A shoe and its method of manufacture in which an upper and preformed rubber outsole are joined by a foamed polyurethane, injection-molded midsole. The rubber outsole and polyurethane foam midsole combine to provide a lightweight and flexible shoe compressively conformable to the flexing foot and having strong traction and long wear.

13 Claims, 16 Drawing Figures

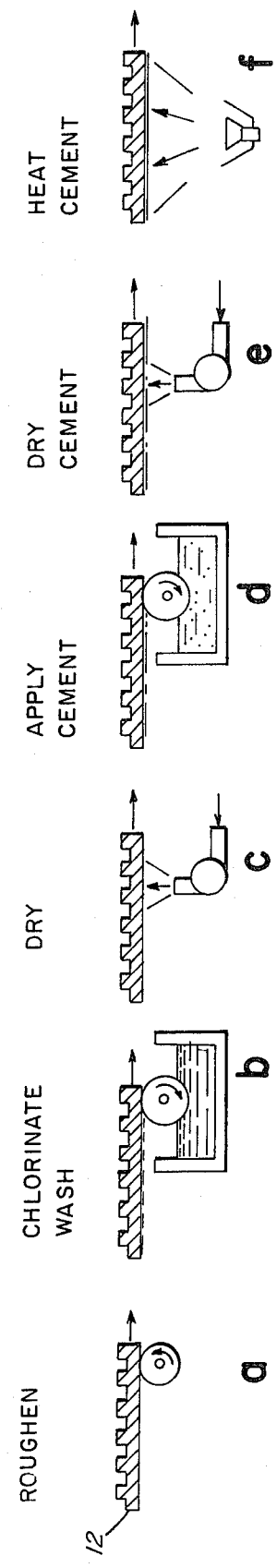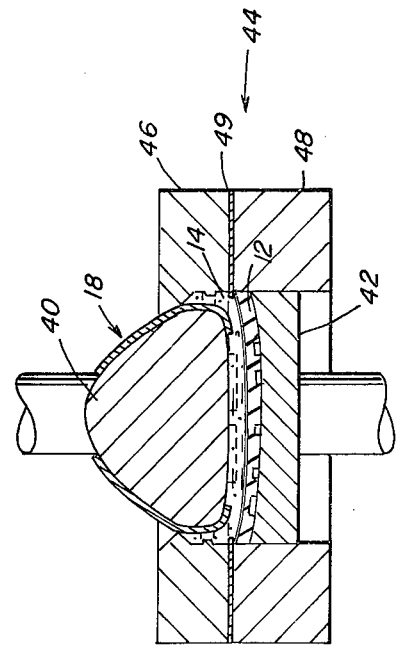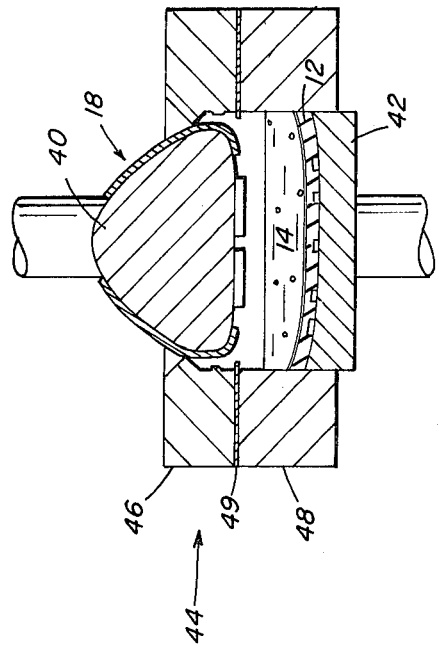

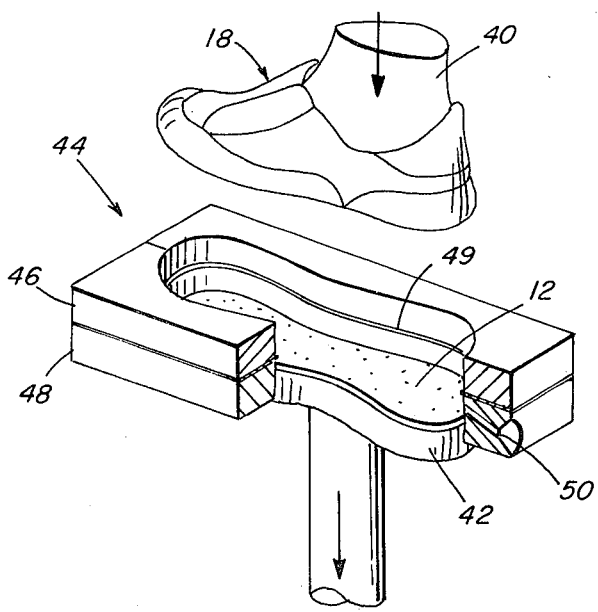
FIG 7
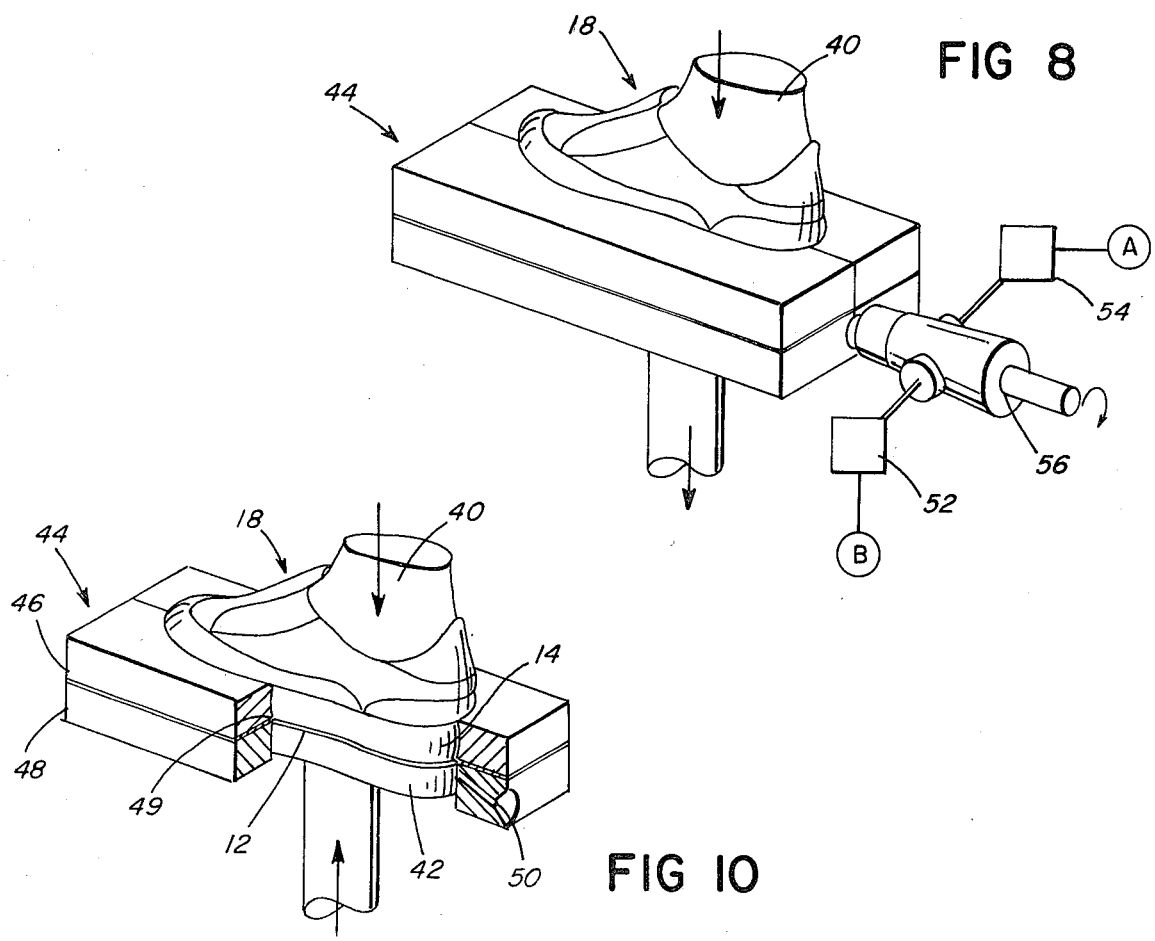
FIG 8
FIG 10

ATHLETIC SHOE

FIELD OF THE INVENTION

This invention relates to athletic shoes.

BACKGROUND OF THE INVENTION

Athletic shoes, particularly those used in court games such as tennis and squash, should ideally combine several characteristics: lightweight; flexibility, so as to conform to foot bending; good court grip; long-wear; and resilient cushioning for foot comfort. Shoe manufacturers have attempted for some time to achieve these properties in an inexpensive yet high quality shoe. But up to now, their shoes have had serious drawbacks. Three general types of court shoe structures are known: a rubber sole vulcanized to an upper; an intermediate rubber biscuit vulcanized between a preformed rubber sole and an upper; and injection-molded soles bonded to an upper. Injection molded soles have been prepared by high-pressure injection of PVC resin or by low-pressure injection of a charge of foamable material, e.g., polyurethane, followed by foaming of the charge. With injection molding, multi-step molding processes have been used, wherein a midsole is molded against an upper and then an outsole is immediately molded against the midsole. The all-rubber shoes, while exhibiting good grip and wear and also having fair resilient cushioning, are heavy and somewhat inflexible, thus tending to tire the user, and expensive to manufacture. Shoes injection molded from PVC are inexpensive and long wearing, but offer poor grip and little resilient cushioning for comfort. Shoes injection molded from polyurethane foam are lightweight, flexible, and resilient, but provide poor grip and wear resistance. Poor grip results because a tread design must be used that will not trap air bubbles during low pressure molding, thus ruling out a good gripping tread. The softness of the material contributes to its poor wear.

SUMMARY OF THE INVENTION

It has been found that all of the sought-after court shoe characteristics can be achieved by forming a composite sole having a preformed rubber outsole bonded to an injection-molded polyurethane foam midsole. The shoe is manufactured by treating the inner surface of a preformed rubber outsole to prepare it for bonding to polyurethane, inserting the treated sole into the bottom of a mold, mounting a preformed upper on a last, lowering the last and closing the mold rings, with the last spaced above the rubber outsole, injecting a charge of foamable polyurethane between the outsole and the last, and allowing the polyurethane to foam under self-generated pressure to form the midsole and to bond with the outsole and upper.

In preferred embodiments, the inner surface of the rubber outsole is prepared for bonding by roughening, chlorinating, applying a cement (e.g., a urethane variety) compatible to bond between rubber and polyurethane, drying the cement, and finally heat-activating the cement; a fin element extends into the mold around the periphery of the shoe at the interface between the rubber outsole and the midsole to prevent spillover of the polyurethane onto the rubber; the substance of the midsole has a density of between 0.40 and 0.75; the rubber sole has a molded tread including pillars with sharp lower edges, to give good grip for sudden stops; and the polyurethane is of the polyester type.

PREFERRED EMBODIMENT

The structure and manufacturing process of a preferred embodiment of the invention will now be described, after first briefly describing the drawings.

FIGS. 6a through 6f are diagrammatic views of the various manufacturing steps used to prepare the rubber outsole for bonding.

FIG. 7 is a diagrammatic, perspective view showing the rubber outsole inserted in a mold and the upper mounted on a last ready for insertion into the mold.

FIG. 8 is a diagrammatic, perspective view showing the upper and last in the mold.

FIGS. 9 and 9a are cross-sectional views through the mold and shoe, showing the two vertical positions of the outsole during the molding process.

FIG. 10 is a diagrammatic, perspective view, partially broken away, of the shoe and mold at the completion of molding.

Figure 1:
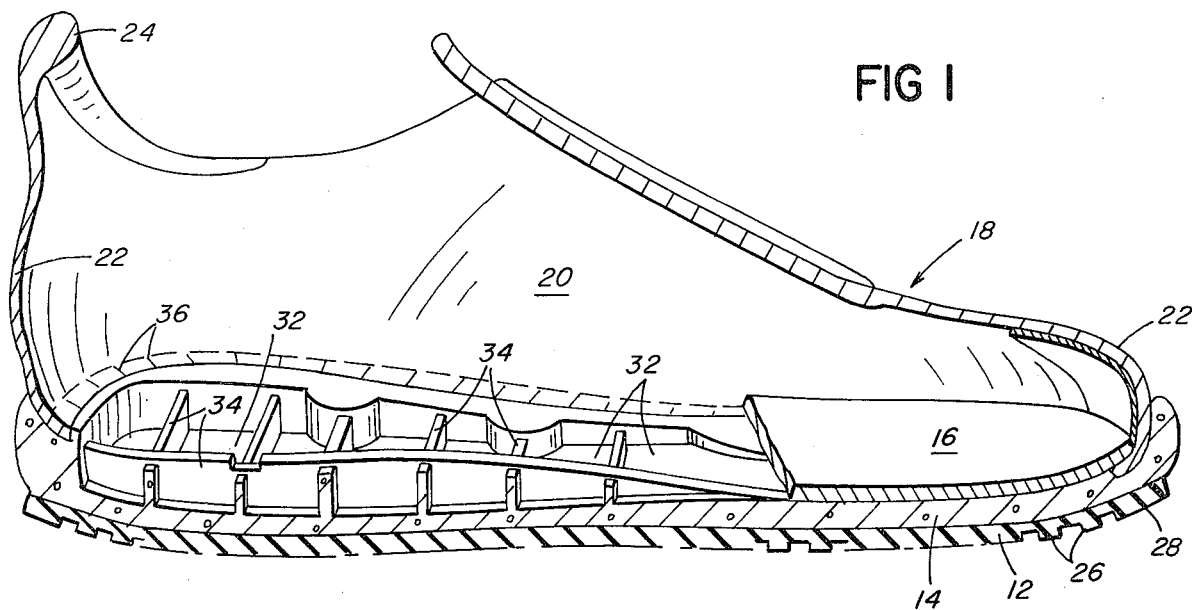
FIG. 1 is a perspective view, partially cross sectioned, of the preferred shoe embodiment.
Figure 2:
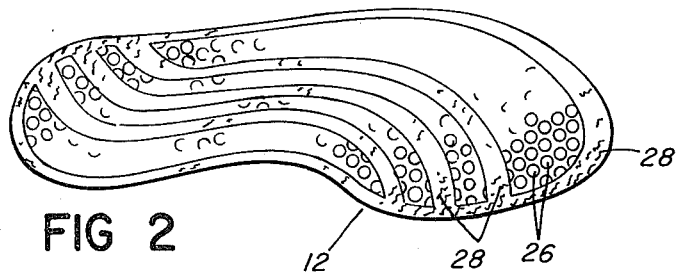
FIG. 2 is a plan view of the tread design of the outsole.
Figure 4:
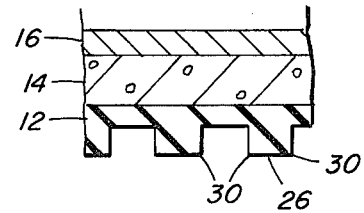
FIG. 4 is an enlarged, somewhat diagrammatic view of a portion of the outsole not under load.
Figure 3:
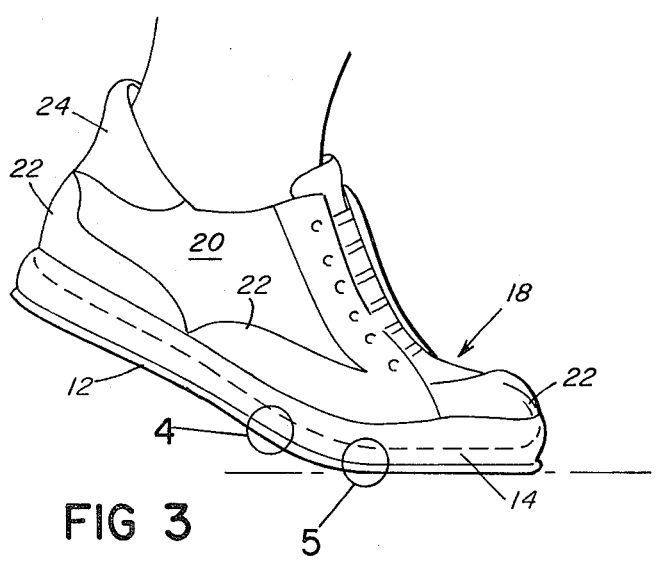
FIG. 3 is an elevation view of the shoe in use.

Turning to FIG. 1, there is shown athletic shoe 10. It has a preformed rubber outsole 12, (combination of natural rubber and synthetic, marketed by American Biltrite under the designation SBR) a polyurethane form midsole 14 (BayFlex 250B, a polyester foamable urethane manufactured by Mobay Chemical Corporation, Pittsburg, Pa.), a conventional full-extent insole 16, and a combination upper 18, composed of nylon body 20, leather edging (i.e. foxing) 22, and vinyl heel trim 24. Rubber outsole 12 has a pattern of pillars 26 separated by regions of textured surface 28 (FIGS. 2 and 4). As a result of use of a conventional high pressure mold for premolding the sole, the lower ends of the pillars have relatively sharp corners 30, and the pillars are relatively deep. Midsole 14 has a honeycomb-like structure of hollow regions 32 and ridges 34 in the region back of the metatarsal area, a geometry provided by suitable formations in the bottom of the metal last. The density of the foamed solid portions of the midsole is 0.5, and it is 3/16 inch thick at its thinnest point. The upper is string lasted, with string and stitching 36 originally exposed and thus bonded in the substance of the midsole.

Figure 5:
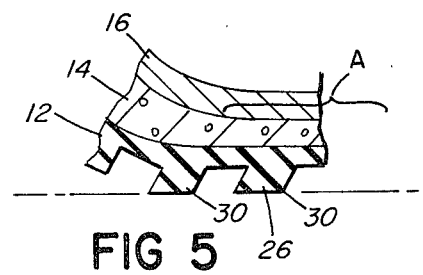
FIG. 5 is an enlarged, somewhat diagrammatic view of a portion of the outsole under a load typical of the situation when the wearer seeks to suddenly stop his forward motion.

The athletic shoe is especially suited for indoor court games such as squash, racketball, or handball. In such sports, the wearer often needs to suddenly stop. The rubber outsole 12 provides needed resilient traction for stopping by means of the desirable friction qualities of rubber, the relatively sharp exposed edges 30 of the pillars and the resilient deflection made possible by the considerable depth of the pillars. The relative hardness of rubber gives the outsole long wear. During a sudden stop, as illustrated in FIG. 5, the foam polyurethane midsole 14 compresses and absorbs shock in region A that would otherwise be felt by the foot, and allows the upper and the outsole to shift their relative positions, with the upper conforming to the natural bend of the foot while the sole grips the surface. This midsole compressive effect can be optimized by selection of the chemical makeup of the polyurethane and selection of an appropriate amount of blowing agent as well as by forming the midsole as a compliant pattern of ridges and spaces.

Manufacture of the shoe begins with a preformed rubber outsole 12 and preformed upper. Referring to FIGS. 6a to 6f, the inner surface of the outsole is prepared for bonding to the midsole by first roughening it with sandpaper or a roughing tool, then washing with a chlorinating primer (#3184 Compo Industries, Inc.), then drying the primer, then coating the upper surfaces with cement (#4624 urethane adhesive, Compo Industries, Inc.), then drying a second time, and just before molding, heat-activating the cement. The chlorination exposes oxygen radicals in the rubber outsole for bonding with the cement.

To complete the shoe, the prepared outsole is placed on the vertically-movable sole plate 42, the preformed upper 18, string lasted around metal last 40 (FIG. 7), is lowered to the mold (FIGS. 8 and 9), and the vertically split mold rings 44 are closed together. Each ring is comprised of upper and lower halves 46, 48 held together by bolts. A thin fin 49 (FIG. 9a) runs all around the mold interior, extending a short distance into the mold from between the two halves 46, 48. The fin prevents the polyurethane of the midsole from leaking down over the sides of the rubber outsole. It also assures a well defined color boundary between the dark-colored outsole and light-colored midsole. Mold sole plate 42 is initially held in its lowered position (FIG. 9), and a measured amount of polyurethane is introduced through inlet port 50. This polyurethane does not initially fill the mold. It is metered into the mold by the interval during which gear pumps 52, 54 are turned on. The pumps deliver the two components A, B (isocyanate and polyol resin) to mixer-injector 56, which turns at about 18,000 rpm. After the measured amount of the mixture is injected, sole plate 42 moves up to engage the upper, outside edge of outsole 12 with fin 49 (FIG. 9a) and to close off inlet port 50. the polyurethane expands within the mold as it foams, and bonds to the rubber outsole and to the leather edging of the upper. To remove the finished shoe, the mold rings 44 are separated (not shown).

Other embodiments are within the following claims.

For each sport or use the pattern of the sole bottom is appropriately selected, for instance a typical basketball or tennis bottom is employed for shoes designed for those sports. Here again the edges of various gripping projections of the soles can be sharply defined to provide good traction and grip, and to present a pleasing stylized appearance as well. Comparable materials to those mentioned for the example from other suppliers and variations thereon can be used to good effect following the invention (for instance in certain instances polyurethane of the polyester type may be selected for the midsole).

The assembly steps can in some instances be varied, for instance the adhesive properties of the polyurethane may be employed to bond to the outsole, omitting the separate cement. Similarly the specific dimensions can be varied in accordance with recognized principles of athletic shoe designers.

What is claimed is:

1. A flexible athletic shoe comprising:
   an upper including a lower edge adapted for bonding to polyurethane,
   a flexible rubber outsole conformable to the flexing foot and having an outer surface providing playing court traction,
   a foamed polyurethane, injection molded midsole in situ bonded by said polyurethane to both said outsole and to said upper,
   whereby said rubber outsole and polyurethane foam midsole combine to provide a relatively inexpensive, lightweight and flexible athletic shoe compressively conformable to the flexing foot with a flexible sole having strong court traction and long wear.

2. A method for manufacturing the athletic shoe of claim 1, comprising the steps of:
   (a) treating the upper surface of a preformed, rubber outsole to prepare it for bonding to polyurethane,
   (b) inserting said outsole, treated side up, in the bottom of a mold,
   (c) mounting an upper on a last, said upper having a lower edge adapted for bonding to polyurethane,
   (d) lowering the last and upper into the mold so as to be spaced above the rubber outsole,
   (e) injecting a charge of foamable polyurethane between the outsole and the last,
   (f) allowing the polyurethane to foam to form the midsole and to bond in situ with the rubber outsole and the upper.

3. The method of claim 2 further comprising the step of raising the outsole upward in the mold after injection of the polyurethane until the upper surface of the outsole engages a fin element extending into the mold around the periphery of the shoe, whereby the fin element prevents the polyurethane from spilling over the sides of the rubber outsole.

4. The method of claim 2 further comprising the steps of preparing the inner surface of the rubber outsole for bonding to the polyurethane by:
   (a) roughening the inner surface;
   (b) chlorinating the inner surface;
   (c) applying a cement that bonds to both rubber and polyurethane, and
   (d) drying the cement.

5. The method of claim 4 further comprising the step of heat-activating the cement prior to insertion of the outsole in the mold.

6. The method of claim 5 wherein said cement is a urethane type.

7. The shoe of claim 1 wherein said midsole has a density of between 0.40 and 0.75.

8. The shoe of claim 1 wherein said rubber includes natural rubber.

9. The shoe of claim 1 wherein said midsole has a honeycomb structure to increase compliance and reduce weight.

10. The shoe of claim 1 further comprising an insole laid over the top of said midsole after molding.

11. The shoe of claim 1 wherein said rubber sole has a tread pattern on its lower surface that includes flexible rubber projections with sharp corners for enhanced grip.

12. The shoe of claim 1 wherein said polyurethane is of the polyester type.

13. The shoe of claim 1 wherein said upper in situ bonded by said polyurethane to said flexible outsole comprises flexible sheet-form material bondable to polyurethane, said upper being of string-lasted form with said lower edge of said upper comprising stitching and string effectively in situ bonded to said rubber outsole.

* * * * *